F. PETERSON.
MITER BOX.
APPLICATION FILED DEC. 28, 1908.
976,097.
Patented Nov. 15, 1910.
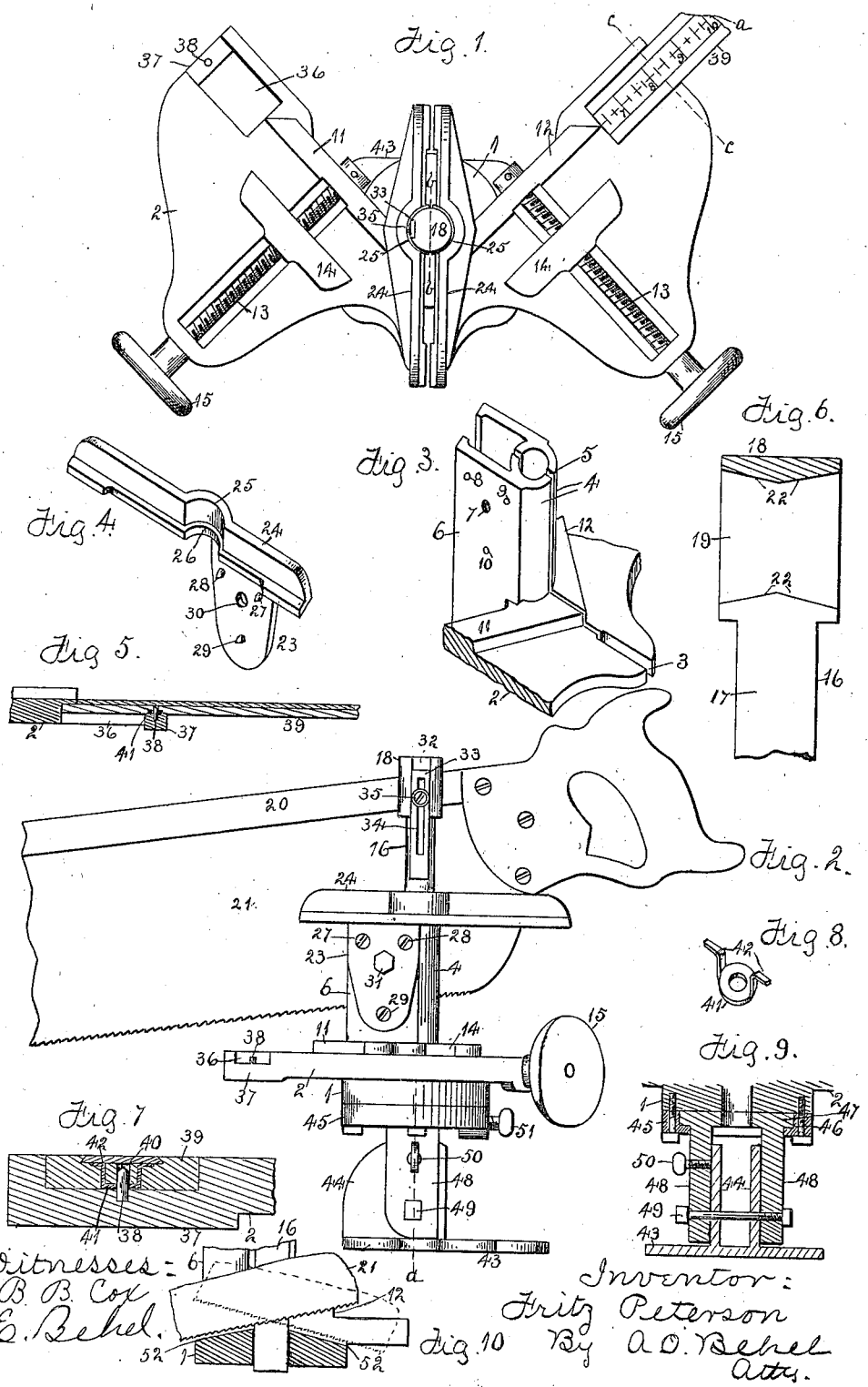
Witnesses:
B. B. Cox
E. Behel
Inventor:
Fritz Peterson
By A. O. Behel
Atty.

UNITED STATES PATENT OFFICE.

FRITZ PETERSON, OF ROCKFORD, ILLINOIS, ASSIGNOR TO STAR MITER MACHINE COMPANY, OF ROCKFORD, ILLINOIS, A CORPORATION OF ILLINOIS.

MITER-BOX.

976,097.  Specification of Letters Patent.  Patented Nov. 15, 1910.

Application filed December 28, 1908. Serial No. 469,710.

*To all whom it may concern:*

Be it known that I, FRITZ PETERSON, a citizen of the United States, residing at Rockford, in the county of Winnebago and State of Illinois, have invented certain new and useful Improvements in Miter-Boxes, of which the following is a specification.

The object of this invention is to construct a miter box in which a single saw guide post is employed, and in which the guide plates for the saw can be adjusted to closely contact with the saw blade.

The further object of this invention is to construct the saw guide with beveled interior surfaces which support the saw back in order that the saw may rock therein in a vertical plane, and in the details of construction set forth in the claims.

In the accompanying drawings Figure 1 is a plan view of my improved miter box. Fig. 2 is a side elevation. Fig. 3 is a perspective view of the bed of the miter box in which portions are broken away. Fig. 4 is a perspective view of one of the saw guide plates. Fig. 5 is a section on dotted line *a* Fig. 1. Fig. 6 is a section of the saw guide on dotted line *b b* Fig. 1. Fig. 7 is a section on dotted line *c c* Fig. 1. Fig. 8 is a perspective view of the bushing for the opening in the end of the rule. Fig. 9 is a section on dotted line *d* Fig. 2. Fig. 10 is a vertical section through the base showing the clearance for the saw as it is rocked in connection with the saw guide.

The base 1 is circular in outline and from it extends a bed 2 in two lateral sections between which is formed a radially extending slot 3, and from the upperface of this base extends vertically two supports 4 for a saw guide. Each support is formed with a semi-circular portion, and the two portions located with reference to one another to leave a vertical space 5 between them, and each portion has a flat surface 6 as shown at Fig. 3. Each flat surface 6 is formed with a screw-threaded opening 7, and three depressions 8, 9, and 10. The upperface of the bed is formed with the rests 11 and 12 located at right angles with respect to one another. Each section of the bed 2 supports a screw 13 which has a screw thread connection with a movable head 14, and a hand wheel 15 is connected to the end of each shaft by which the shaft may be rotated, and the head 14 moved toward or from its rest. A cylindrical saw guide 16 is formed with a lengthwise extending slot 17, and with an enlarged upper end 18 which has a transverse opening 19 for the reception of the back 20 of a saw 21. The upper and lower ends of the opening are formed with the beveled surfaces 22. To each of the flat surfaces 6 of the support is secured a saw guide plate comprising the vertical section 23, and the horizontally extending section 24 having a semi-circular depression 25 at the bottom of which is formed the inwardly extending ledge 26. Each vertical section 23 supports three screws 27, 28 and 29, and has an opening 30 through which a screw 31 freely passes, that is, this opening is considerably larger than the diameter of the screw. The plates 23 are located against the flat faces 6, and the screws 27, 28 and 29 are seated in the recesses 8, 9, and 10 respectively, and the screw 31 is turned in connection with the screw threaded opening 7 in the flat surface. With the screw in the opening 27 of the plate and turned in the screw threaded opening 7 of the flat surface 6 the plate can be adjusted to fit against the saw blade 21, leaving sufficient room for clearance, after which the screw is turned up hard against the section 23.

The saw guide 16 has a lengthwise groove 32 in the head portion 18 thereof, and within this groove is seated a plate 33 provided with a slot 34 through which a screw 35 passes into the head portion. By means of this plate as it strikes the inwardly extending ledge 26, the depth at which the saw guide 16 will descend may be regulated thereby regulating the descent of the saw.

Each lateral section of the bed is formed with an opening 36 across which is located a bar 37 from which extends a stud 38. A rule 39 is formed with an opening 40 which receives the stud 38. In use, this opening 40 is considerably enlarged which destroys the accuracy of the rule, and in order to overcome this objection, I have employed a bushing 41 having prongs 42 which are passed through the wood portion of the rule and clenched as shown at Fig. 7. As the bushing is held stationary in connection with the rule and encircles the stud 38, all wear of the wood around the stud will be obviated.

A standard 43 has uprights 44. To the underface of the base 1 is secured a ring 45 formed with a recess 46 in its upper face. Within the recess 46 is located a head 47 from which depends two arms 48 which embrace the upper faces of the uprights 44, and pivotally connected thereto by the bolt 49. A set screw 50 is supported by one of the arms 48 and contacts with one of the uprights 44 in order to hold the arms and the upper structure of the miter box supported thereby in any adjusted position within the range of the movements. A thumb screw 51 is supported by the ring 45 and contacts with the head 47 located in the recess 46. As the standard 43 and head 47 are stationary so far as rotations are concerned, the upper structure can be rotated around the head 47 and held when adjusted by the thumb screw 51.

As shown at Fig. 2, when the saw is not in use, the handle thereof may be placed on the horizontal sections 24 of the saw guide plates.

In this construction of miter box, only one saw guide is employed in connection with the guide plates which makes a very simple, cheap and durable construction. The base 1 is formed with downwardly extending cuts 52 forming a continuation of the vertical space 5 between the supports 4 in order that clearance may be had as the saw is rocked in its connection with the guide as shown at Fig. 10.

I claim as my invention.

1. In a miter box, the combination of a bed, a saw guide-way supported by the bed, a saw guide located in the guide-way, and saw guide plates, one located each side of the saw guide, each plate supporting three set screws and a clamping screw by which the plate is adjusted to the saw blade.

2. In a miter box, the combination of a bed, a saw guide-way supported by the bed and a saw guide located in the guide-way, the saw guide formed with an enlarged transverse saw-back receiving opening which has its outer ends of greater vertical length than its center.

3. In a miter box, the combination of a bed, a saw guide-way supported by the bed, the guide-way being formed with a lengthwise slot for the passage of a saw blade and the bed formed with downwardly extending slots at the lower end of the slot in the guide-way, said downwardly extending slots having inclined bottoms, and a saw guide supported by the guide-way and having a saw-receiving slot.

4. In a miter box, the combination with a support, of a vertically movable saw guide mounted thereon, and saw-embracing guide plates mounted on the support separately from and on opposite sides of the saw guide.

5. In a miter box, the combination with a support having a guideway, of a saw guide movably mounted in the guideway, and saw guide plates mounted on the guideway independently of the saw guide and located on opposite sides thereof.

6. In a miter box, the combination with a support, of a saw guide movably mounted thereon, and saw guide plates mounted on the support independently of the saw guide and disposed on opposite sides thereof, said plates being adjustable toward and from each other.

7. In a miter box, the combination with a support, of a saw guide movably mounted thereon, and saw guide plates mounted on the support independently of the saw guide and disposed on opposite sides thereof, and means for securing the plates against movement while permitting the free movement of the saw guide.

8. In a miter box, the combination with a support having a guideway, that comprises spaced sections provided with a vertical bore, of a vertically movable slotted saw guide located in the bore, saw guide plates secured to the outer sides of the guideway sections, and means for adjusting said plates.

9. In a miter box, the combination with a bed having an upstanding guide comprising spaced sections formed with a vertical bore, and rearwardly extending wings, of a saw guide vertically movable in the bore, saw guide plates located alongside the wings, and means engaging the plates and wings for holding the latter to the former and adjusting them.

10. In a miter box, the combination with a supporting bed, of a vertically movable guide mounted therein and having a saw-receiving slot therethrough, said slot having an enlarged saw back-receiving opening at its upper end, the opening tapering vertically from its opposite ends to its center.

In testimony whereof I have hereunto set my hand in presence of two subscribing witnesses.

FRITZ PETERSON.

Witnesses:
A. O. BEHEL,
E. D. E. N. BEHEL.